(12) United States Patent
Taylor et al.

(10) Patent No.: US 7,028,704 B2
(45) Date of Patent: Apr. 18, 2006

(54) FILL VALVE

(75) Inventors: Alan L. Taylor, Beaver Dam, KY (US); Wallace G. McCray, Bowling Green, KY (US); Douglas S. Richmond, Zionsville, IN (US)

(73) Assignee: Morgantown Plastics Company, Morgantown, KY (US)

( * ) Notice: Subject to any disclaimer, the term of this patent is extended or adjusted under 35 U.S.C. 154(b) by 226 days.

(21) Appl. No.: 10/113,273

(22) Filed: Apr. 1, 2002

(65) Prior Publication Data

US 2003/0106587 A1  Jun. 12, 2003

Related U.S. Application Data

(63) Continuation of application No. 09/421,037, filed on Oct. 20, 1999, now abandoned.

(60) Provisional application No. 60/104,919, filed on Oct. 20, 1998.

(51) Int. Cl.
*F16K 31/34* (2006.01)

(52) U.S. Cl. ............ 137/414; 137/426; 137/432; 137/442; 137/443; 251/40; 251/45

(58) Field of Classification Search ............ 137/414, 137/426, 432, 436, 437, 442, 443, 444, 545; 251/40, 45, 46
See application file for complete search history.

(56) References Cited

U.S. PATENT DOCUMENTS

| | | | |
|---|---|---|---|
| 2,235,304 A * | 3/1941 | Toussaint | 251/45 |
| 2,328,323 A * | 8/1943 | Bowers et al. | 137/414 |
| 2,833,300 A * | 5/1958 | Sirotek | 137/414 |
| 3,194,258 A * | 7/1965 | Grant | 137/414 |
| 3,669,138 A * | 6/1972 | Schoepe et al. | 137/218 |

(Continued)

FOREIGN PATENT DOCUMENTS

EP  0369404 A1 *  5/1990  ............ 137/414

*Primary Examiner*—Kevin Lee
(74) *Attorney, Agent, or Firm*—Kwadjo Adusei-Poku; Lloyd D. Doigan

(57) ABSTRACT

A fill valve assembly for a water tank such as a toilet tank. The fill valve assembly includes a head portion containing a valve mounted on top of a vertical water outlet tube and a float which moves vertically along the outlet tube to control the opening and closing of the valve. The float is vertically adjustable without removal or disassembly of the valve assembly in order to adjust the tank water level to a preselected position. The float includes an inverted cup-shaped structure which moves vertically along the outlet tube in response to any change in the water level. The valve contains a flexible main valve disk held in a closed position against a valve seat by water pressure in a control chamber to prevent the flow of water into the tank, and is moved to an open position upon venting of the control chamber. A pilot valve controls the pressure in the control chamber and, therefore, the movement of the main valve disk. The pilot valve is controlled by a lever mechanically connected to the float so that when the float drops with the falling water level the pilot valve is opened, thereby venting the control chamber and allowing the main valve disk to flex upwardly off of the valve seat to allow water to enter the tank. When the float rises with the rising water level to an upper predetermined position, the pilot valve is closed by the lever and the main valve disk is returned to its closed position against the valve seat to block the flow of water into the tank.

8 Claims, 15 Drawing Sheets

U.S. PATENT DOCUMENTS

| | | | |
|---|---|---|---|
| 3,693,649 A * | 9/1972 | Gordon et al. | 137/432 |
| 3,895,645 A * | 7/1975 | Johnson | 137/414 |
| 4,100,928 A * | 7/1978 | Schoepe | 137/414 |
| 4,295,488 A * | 10/1981 | Book | 137/426 |
| 4,338,964 A * | 7/1982 | Schoepe | 137/436 |
| 4,573,495 A * | 3/1986 | Rothe et al. | 137/414 |
| 4,883,254 A * | 11/1989 | Whiteside | 251/40 |
| 5,421,361 A * | 6/1995 | Johnson | 137/414 |
| 5,490,659 A * | 2/1996 | Whiteside | 251/40 |
| 5,582,205 A * | 12/1996 | McCarthy et al. | 137/549 |
| 5,715,859 A * | 2/1998 | Nichols-Roy | 137/414 |
| 5,738,141 A * | 4/1998 | Blanke et al. | 137/414 |
| 5,887,848 A * | 3/1999 | Wilson | 251/40 |
| 5,967,182 A * | 10/1999 | Wilson | 251/40 |

\* cited by examiner

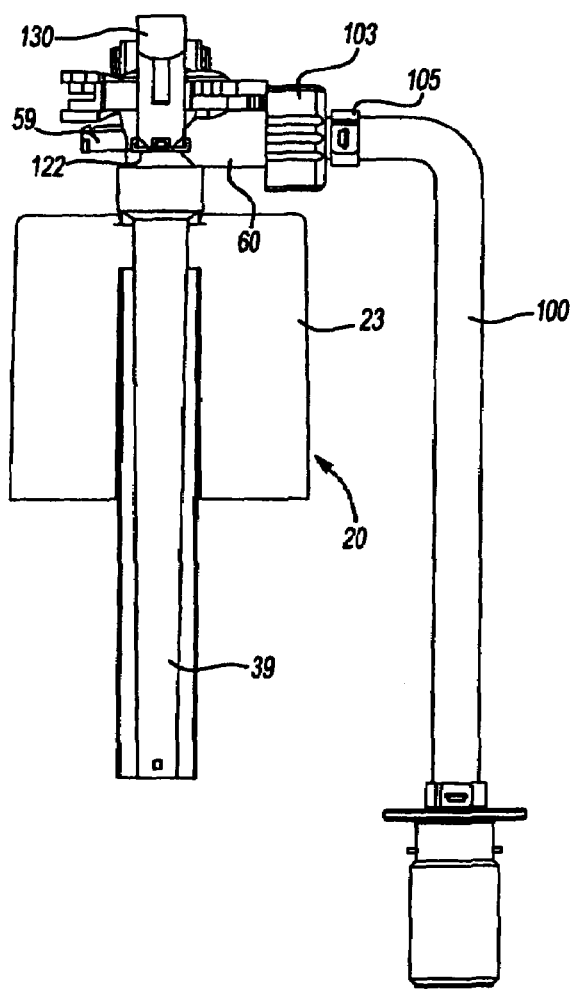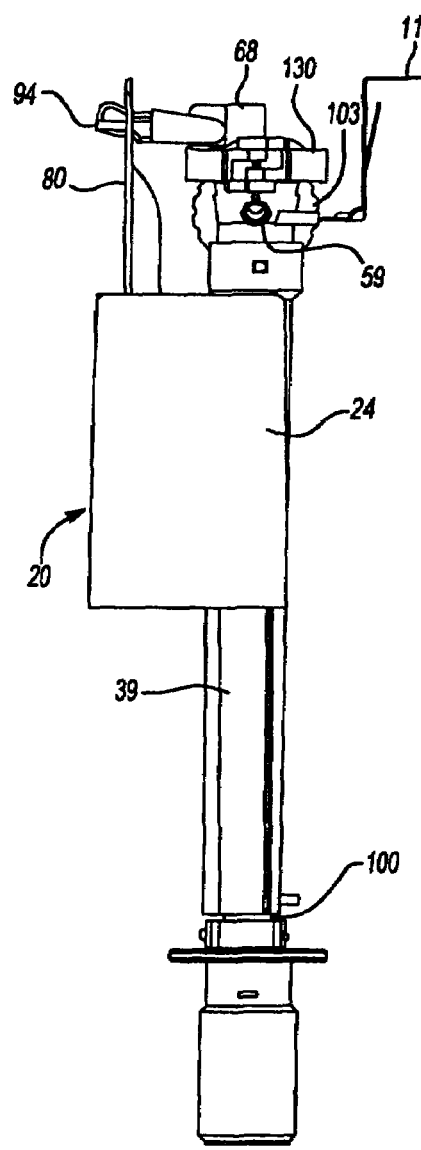
Fig-4
Fig-5

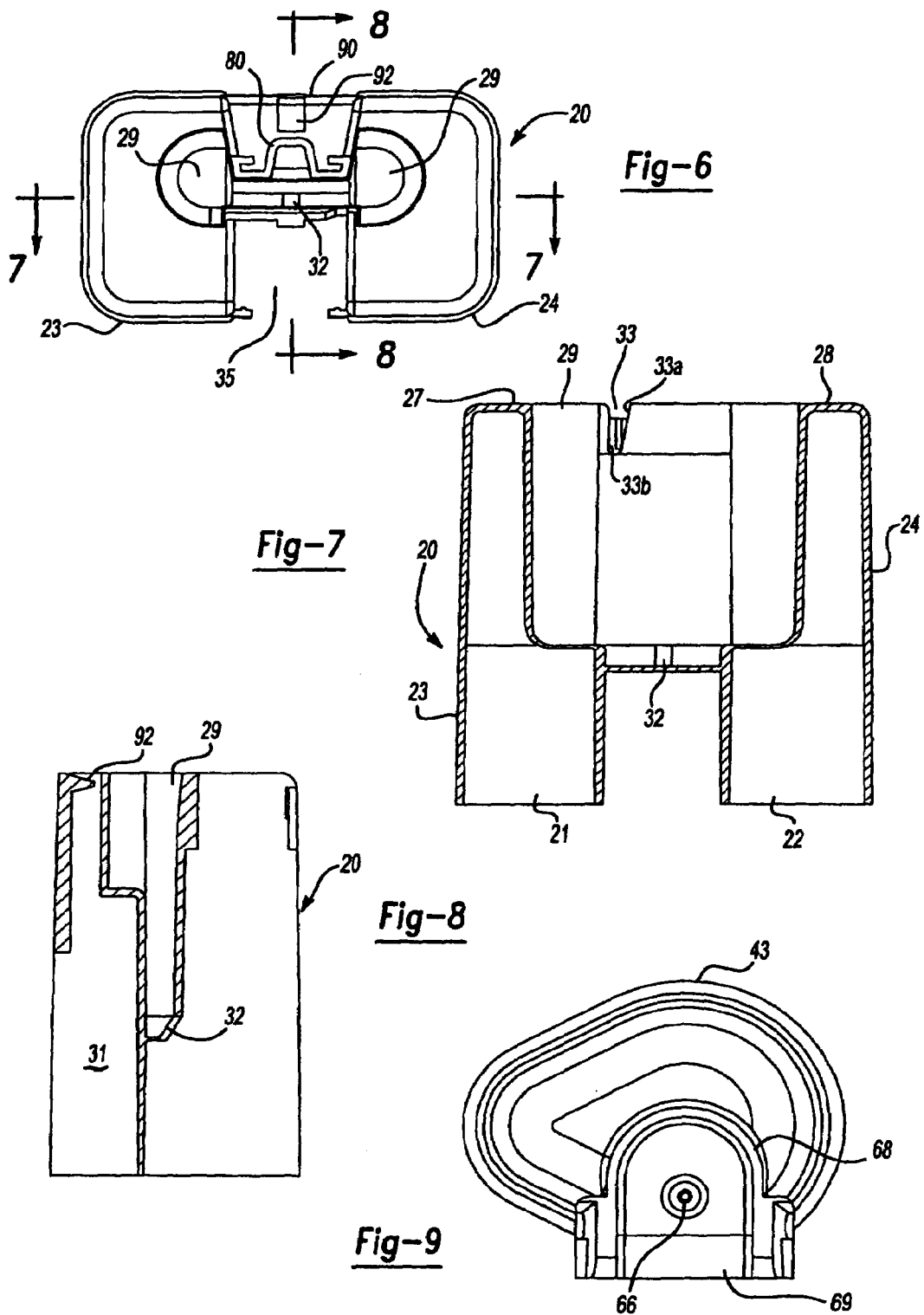

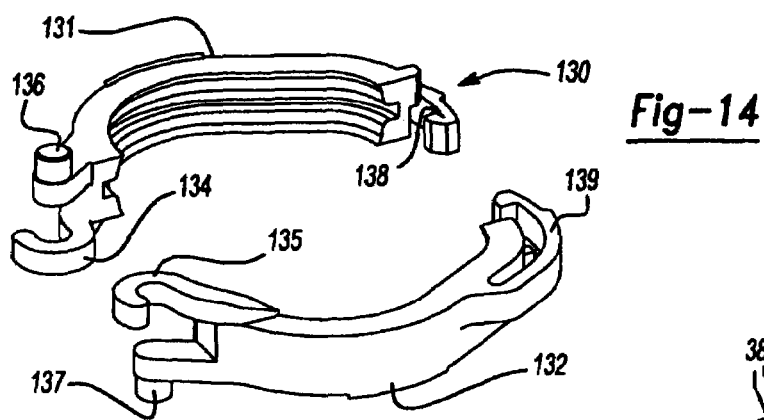
*Fig-14*
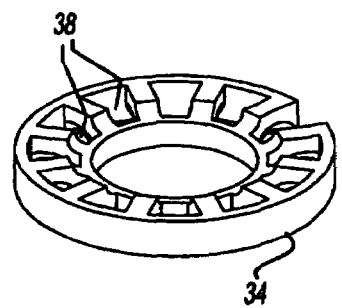
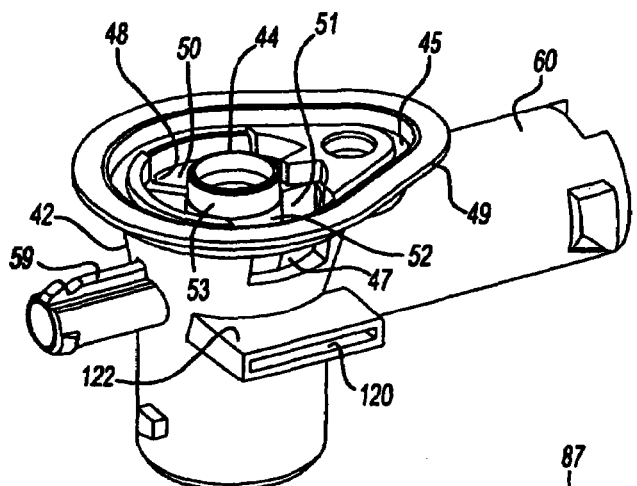
*Fig-15*
*Fig-16*
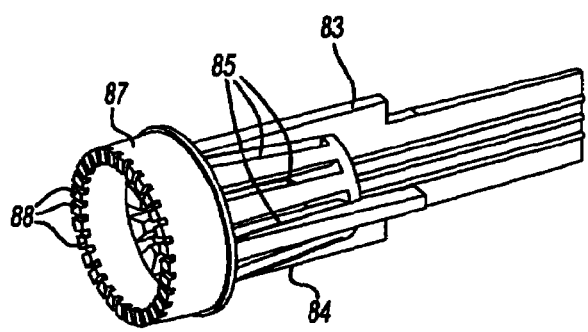
*Fig-17*
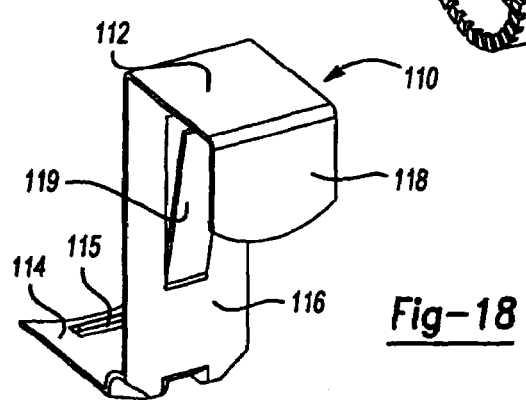
*Fig-18*

# FILL VALVE

RELATED APPLICATIONS

This application is a continuation of U.S. application Ser. No. 09/421,037, filed Oct. 20, 1999, now abandoned.

This application claims priority from U.S. Provisional Application No. 60/104,919 filed on Oct. 20, 1998.

FIELD OF THE INVENTION

The instant invention relates to fill valves. More specifically, it relates to water control valves for flush tanks associated with water closets.

SUMMARY OF THE INVENTION

The fill valve of the instant application is a pilot operated device that uses the hydraulic force of the supply water to open and close the main valve disc.

A float is used on this fill valve to sense the water height. As the water level increases, the float rises, pressure is transferred to the pilot orifice through the use of a lever and seat seal. As the pilot orifice closes a combination of pressure and area differential causes the main seal to close. Area differential assures the valve remains in the off condition.

The float is attached to a lever via an adjustable rod which allows for fine adjustment within a three inch window. The lever pivots about an axle. The axle in conjunction with the guide tube keep the float and seat in alignment. As the float rises detent water from the pilot orifice is directed via the lever and rod into a detent chamber on the top of the float (the weir style drain on the float provides uniform percentage of detent water over a large pressure range). As the float rises the seat is directed towards the pilot orifice. As the seat occludes the pilot orifice pressure rises in the upper disc chamber. The increase of pressure in the upper disc chamber causes the main disc (a flexible membrane) to migrate toward the double main seal located on the supply inlet of the body. As the double seal becomes occluded the area of the pressure field on the lower side of the main valve disc decreases which results in an area differential top to bottom and a net force acting upon the main valve disc in the off direction.

As the main flow of water shuts off and the detent water supplied by the pilot orifice decreases, the detent water drains from the detent chamber of the float through a weir. This provides additional buoyancy to the float which results in additional force acting upon the seat. This additional force applied to the pilot orifice assures positive shut off of the valve over a large pressure range.

When the water level drops, the float drops and causes the seat to move away from the pilot orifice. Pressure in the upper main valve disc chamber decreases due to an area differential between the filtered supply inlet to the upper chamber and the pilot orifice. Water flows out faster than it can flow into the main disc chamber due to area differential between the filtered inlet to the chamber and the pilot orifice exit causing pressure in the upper main disc chamber to drop to essentially zero. The supply water than provides the opening force to the main valve disc to turn the valve on.

The anti-siphon device on this fill valve aspirates air into the reseal tube when in the on condition. When off the venturi acts as a communication port with the atmosphere. When a negative pressure is drawn on the supply and if the main valve disc seal fails air is drawn into the supply through the venturi. This siphon break prevents water supply cross contamination with no additional parts.

BRIEF DESCRIPTION OF THE DRAWINGS

FIG. 4 is a rear elevational view of the fill valve showing the float in a raised position and the water inlet tube attached to the valve head;

FIG. 5 is a left side elevational view of the fill valve showing the float in a raised position, the water inlet tube attached to the valve head, and the mounting clip attached to the valve head;

FIG. 6 is a top plan view of the float;

FIG. 7 is a view taken along line 7—7 in FIG. 6 showing the two drains in the detent chamber;

FIG. 8 is a view taken along line 8—8 in FIG. 6 showing the drain in the bottom of the detent chamber;

FIG. 9 is a top plan view of the cap of the valve head with the pilot valve orifice;

FIG. 14 is a top, exploded perspective view of the valve head clamp;

FIG. 15 is a top, perspective view of the valve head ring insert;

FIG. 16 is a top rear perspective view of the valve head body with the valve head cap, flexible diaphragm, and ring insert removed.

FIG. 17 is a perspective view of the filter;

FIG. 18 is a rear perspective view of the valve head hook;

DESCRIPTION OF THE PREFERRED EMBODIMENT

Figures 1, 2:
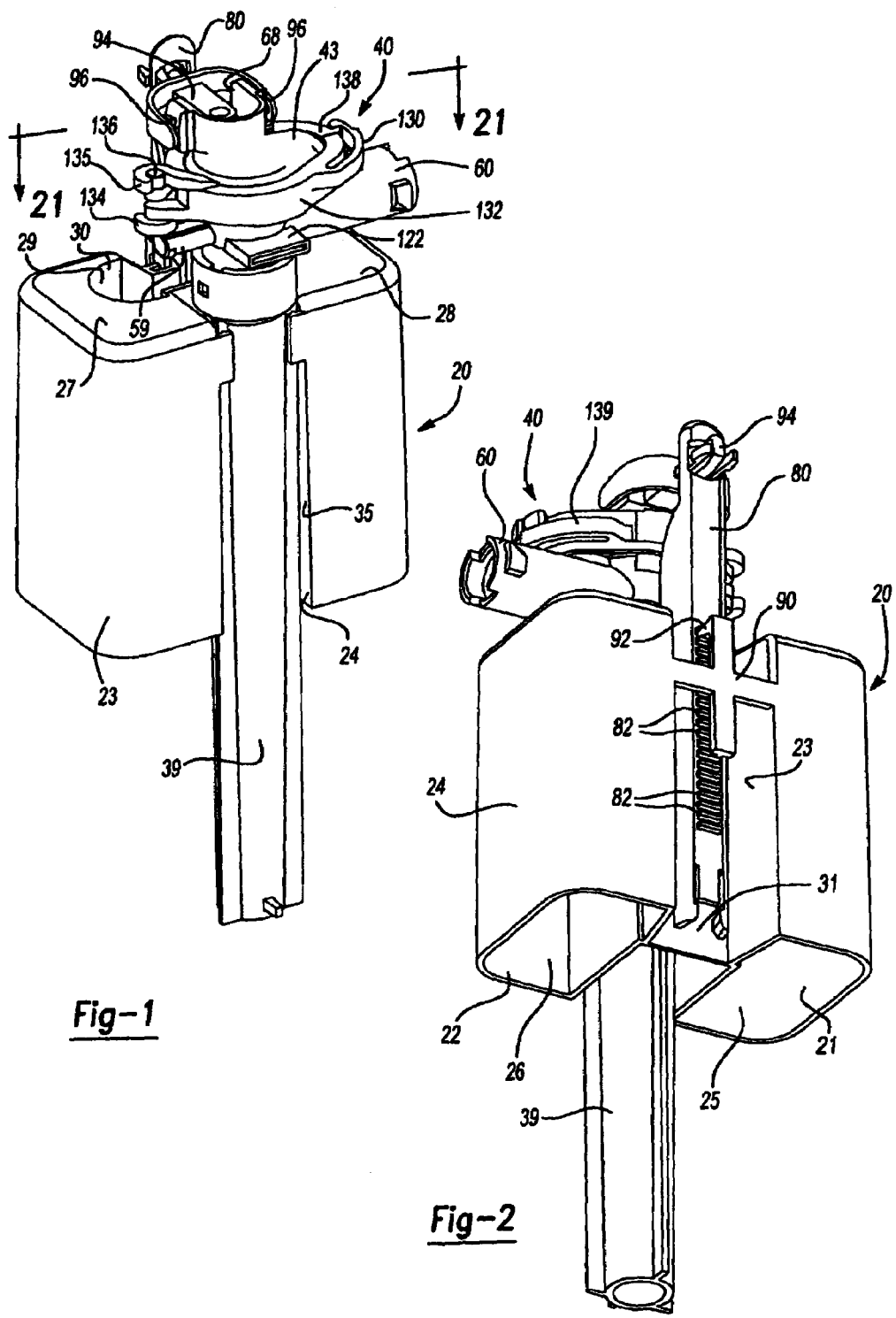
FIG. 1 is a top, rear perspective view of the fill valve showing the float in a raised position and the outlet tube.
FIG. 2 is a bottom, front perspective view of the fill valve showing the float in a raised position and the vertical adjustment bar, bayonet lug, and locking teeth, with the float adjusted in the uppermost position on the vertical adjustment bar and being in a raised position.

The float 20 includes two inverted cup shaped structures 21, 22. The cup shaped structures 21, 22 are enclosed by side walls 23, 24. They are open at their bottom ends 25, 26 and closed at their tops by top walls 27, 28. The cup shaped structures 21, 22 are separated by two longitudinally extending slots 31, 35. Slot 35 is defined by side walls 23 and 24 and back wall 36. Slot 35 is sized to receive outlet tube 39. Float 20 slides vertically up and down on outlet tube 39 as the water level in the tank rises and falls.

Figure 26:
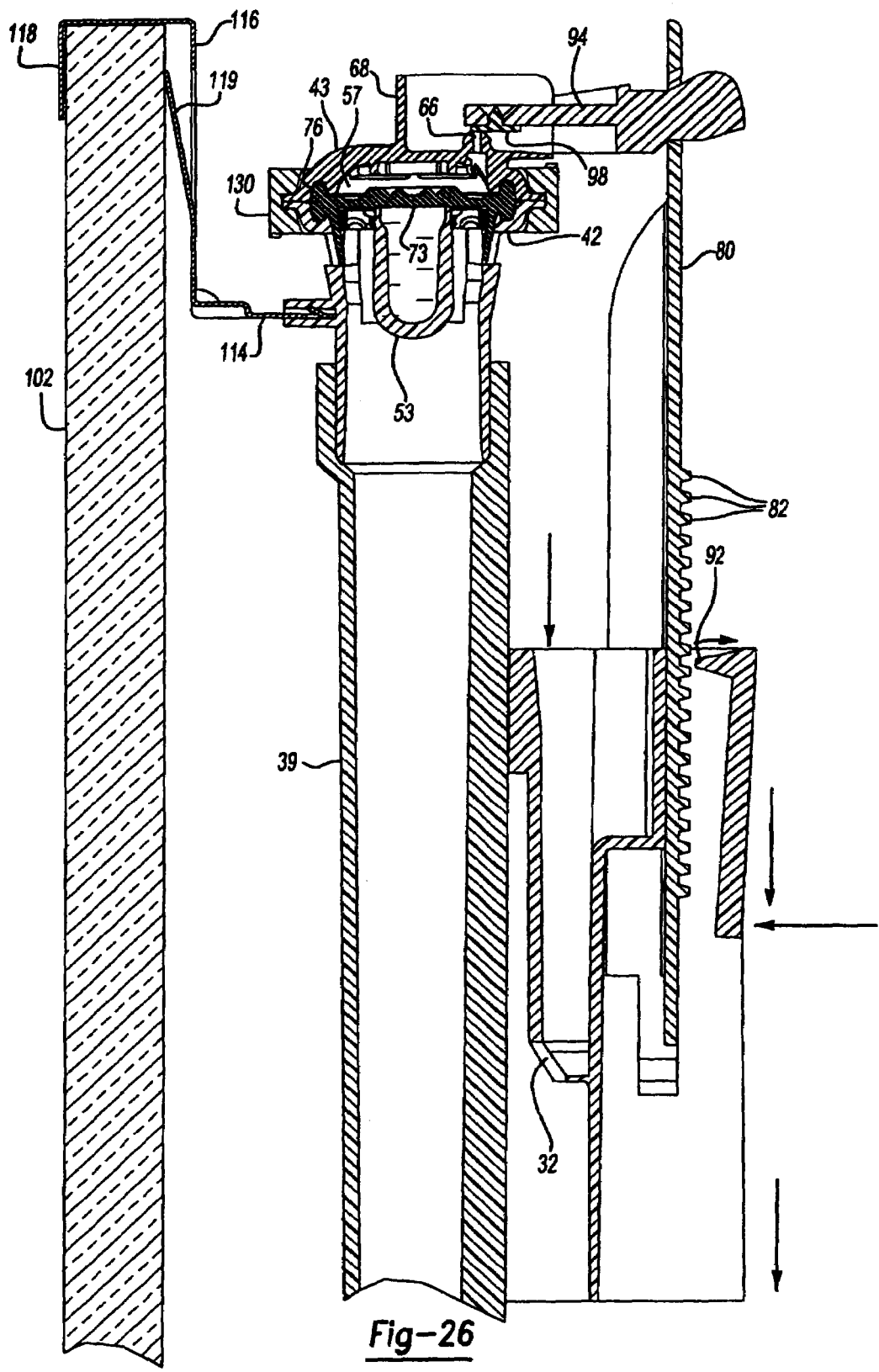
FIG. 26 shows the float being adjusted on the vertical adjustment bar with the bayonet lug pulled outwardly from its normal position in the space between adjacent teeth so the float can be moved up or down on the adjustment bar.
Figure 27:
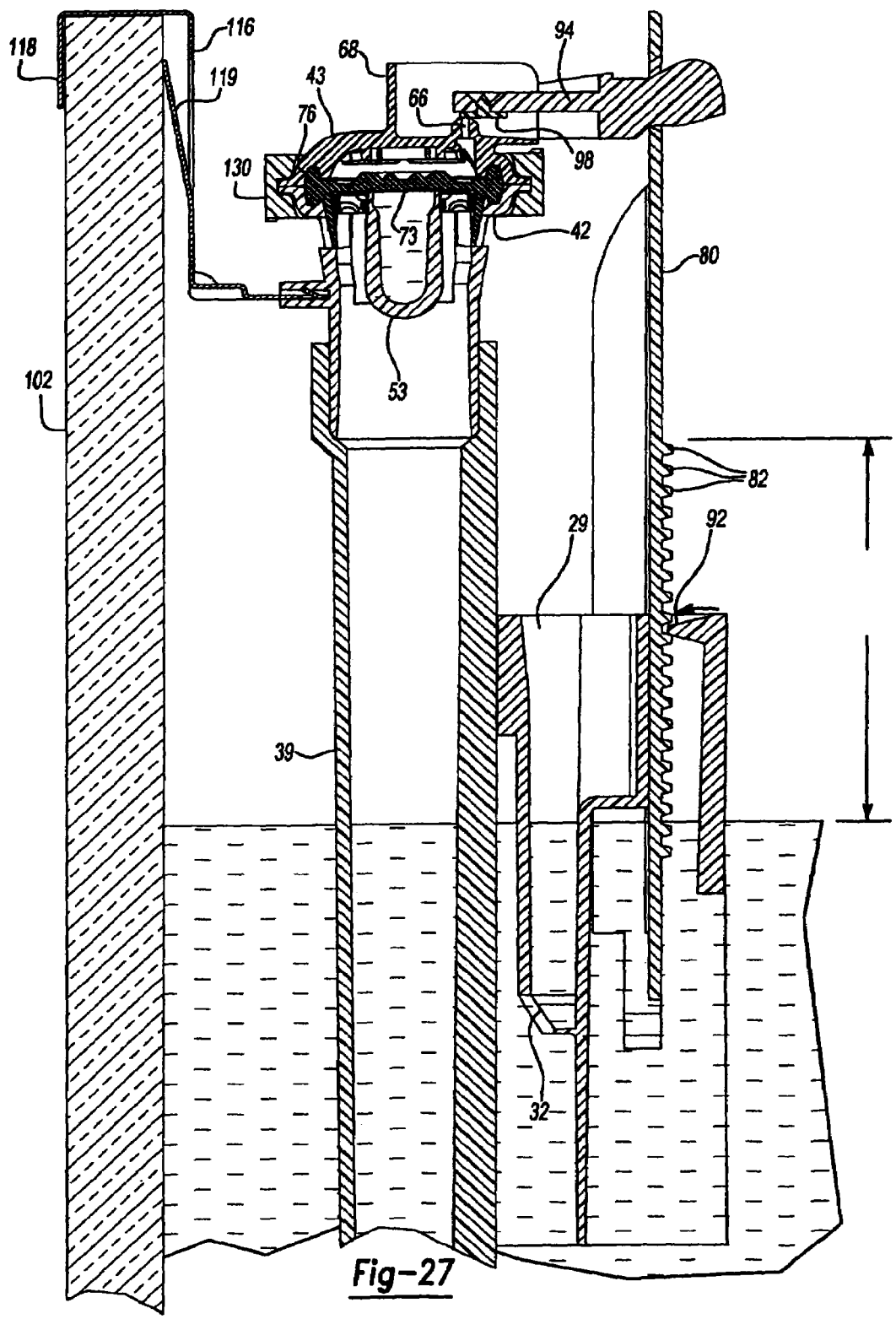
FIG. 27 shows the bayonet lug returning to its normal position in the space between adjacent teeth to lock the float in place on the adjustment bar.

A desired water level in the tank can be selected by preselecting the position of the float, i.e., moving or adjusting the position of the float up or down on the adjustment bar 80 within the tank relative to the valve head 40. The newly selected position of the float is retained by a bayonet locking system on the adjustment assembly that prevents unintentional readjustment of the float 20. The adjustment assembly comprises a vertical adjustment bar 80 having a row of vertically spaced locking teeth 82. The bar 80 is vertically adjustably mounted in slot 31 which is defined by side walls 23 and 24 and front wall 37 of the float 20 and is frictionally held by side tabs in slot 31. Bar 80 can be moved up or down in slot 31 upon application of force sufficient to overcome the frictional force holding bar 80 in slot 31 against vertical movement. A cross bar 90 formed integrally with walls 23 and 24 of float 20 and a bayonet lug 92 on cross bar 90 are fixedly mounted on the outside of opening of slot 31. Bayonet lug 92 is normally biased inwardly so that it is disposed in a space between adjacent teeth 82. When the lug 92 is pulled outwardly from its normal position in the space between adjacent teeth 82, as illustrated in FIG. 26, it is disengaged from teeth 82 and float 20 may be freely raised and lowered to a new position. After the float 20 is in the new position lug 92 is released and snaps back to its normal position between different adjacent teeth thereby preventing movement of the float 20 relative to bar 80, as illustrated in FIG. 27.

Float 20 is mechanically coupled to bar 80 so that, as the float 20 moves up or down, bar 80 will also move up or down over the same vertical distance. The bar 80 is mechanically coupled to a substantially horizontal pivoting lever 94 which is pivoted at 96. A pilot orifice seal 98 is mounted in one end of lever 94 and moves with lever 94. The pilot orifice seal 98 moves in a substantially vertical direction as the lever 94 pivots about its pivot point 96.

The float 20 has a detent chamber 29 at the top of the float 20. Water from the pilot valve orifice 66 flows into the detent chamber 29 which is open at its top 30. The detent chamber 29 has two drains for draining the water out of the detent chamber 29. One drain 32 is located at the bottom of detent chamber 29. It is normally submerged, that is, it is below water level in the tank. The second drain 33 is a weir type drain located in the side wall of detent chamber 29 near its top. Weir type drain 33 is wide at its top 33A and narrows toward its bottom 33B. Thus, the more water in the detent chamber 29 and, therefore, the higher the water level in the detent chamber 29, the quicker the outflow of water through drain 33. Conversely, the lower the water level in the detent chamber 29 the slower the outflow of water through drain 33.

As the flow of water from the pilot orifice 66, which is the source of water for detent chamber 29, decreases or stops, the detent water drains from the detent chamber 29 through the two drains 32, 33. This provides additional buoyancy to the float 20 which results in additional force acting upon lever 94 and, therefore, pilot orifice seal 98. This additional force applied to the pilot orifice seal 98 ensures positive shut-off of the pilot orifice 66 and, consequently, of the valve over a large pressure range.

The valve head 40 contains the main valve mechanism. The main valve mechanism includes a body section 42 and a cap 43. A flexible diaphragm 72 is peripherally held between the body section 42 and the cap 43. Due to the fact that the diaphragm 72 is held peripherally by the body section 42 and cap 43, the central bottom section 73 of the diaphragm 72 is free to move upwardly off of or downwardly against valve seat 44.

The diaphragm 72 contains a generally flat bottom side 74 which contacts valve seat 44 and a contoured top side 75. The top side 75 is contoured to increase its surface area and, therefore, increase the water pressure acting on the top side 75 of the diaphragm and forcing the diaphragm to move downwardly against valve seat 44. Diaphragm 72 includes upwardly and downwardly extending ridges 76 around its periphery. These ridges 76 are adapted to fit into correspondingly shaped peripheral grooves 45, 46 in the body 42 and cap 43 whereby the diaphragm 72 is held peripherally by body 42 and cap 43.

Diaphragm 72 has two downwardly extending flexible flaps 77, 78 at its two opposite sides. The two flaps 77, 78 cooperate with windows 47, 48 in body section 42 to form an antisiphon valve. When the interior outlet passages 50, 51 are pressurized the two flaps 77, 78 are pushed against the windows 46, 48. Flaps 77, 78, being larger than windows 46, 48, completely close and seal windows 46, 48 and keep air from entering the interior of the valve head. If there exists a negative pressure in the water supply line, and therefore, the pressure inside the valve head is less than the pressure outside body section 42, the flaps 77, 78 are moved inwardly, thereby breaking the seal with windows 47, 48 and allowing air to be drawn into the valve head and to the supply inlets.

Figure 13:
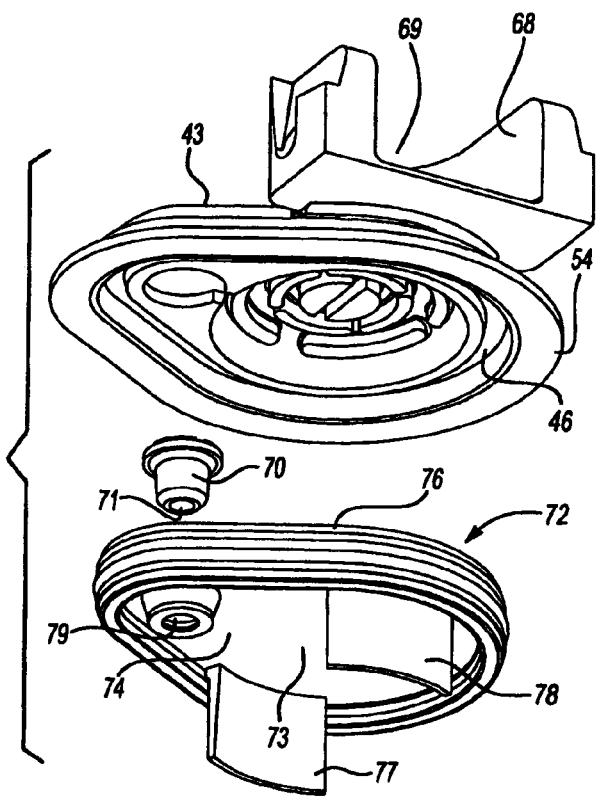
FIG. 13 is a front, bottom, exploded perspective view of the valve head cap and flexible diaphragm and pilot valve cavity inlet aperture.
Figure 13A:
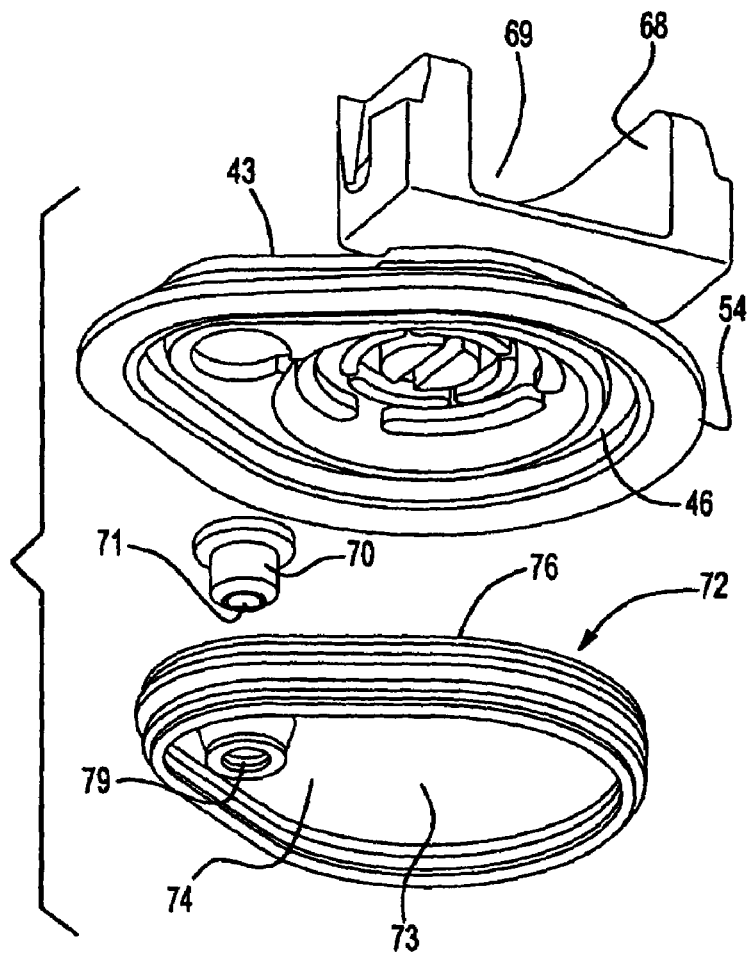
FIG. 13*a* is an alternative embodiment of FIG. 13, with no flexible flaps.
Figure 16A:
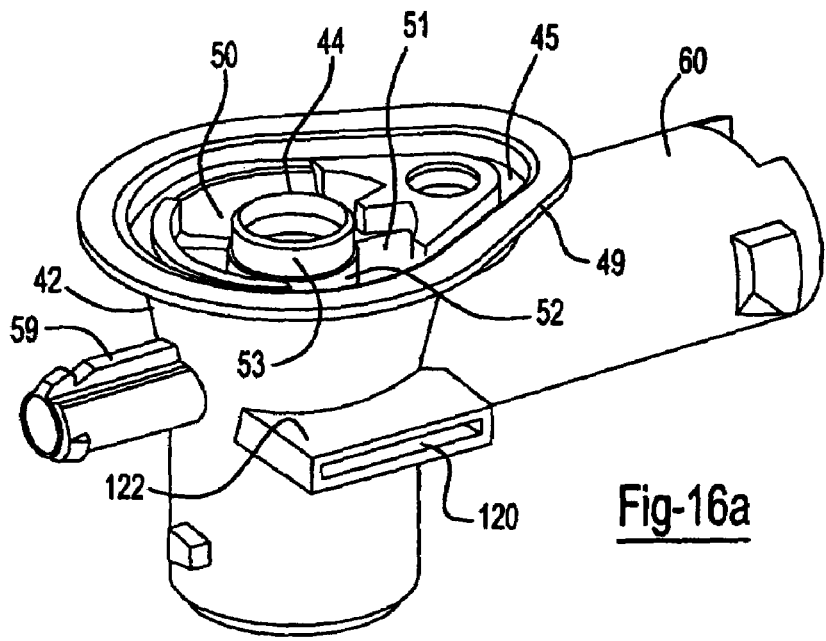
FIG. 16*a* is a top rear perspective view of an alternate embodiment of the valve head body with the valve head cap, flexible diaphragm, and ring insert removed.

In an alternate embodiment as illustrated in FIG. 13a and FIG. 16a, diaphragm 72 has no flaps 77 and body section 42 has no windows 47, 48.

Figure 3:
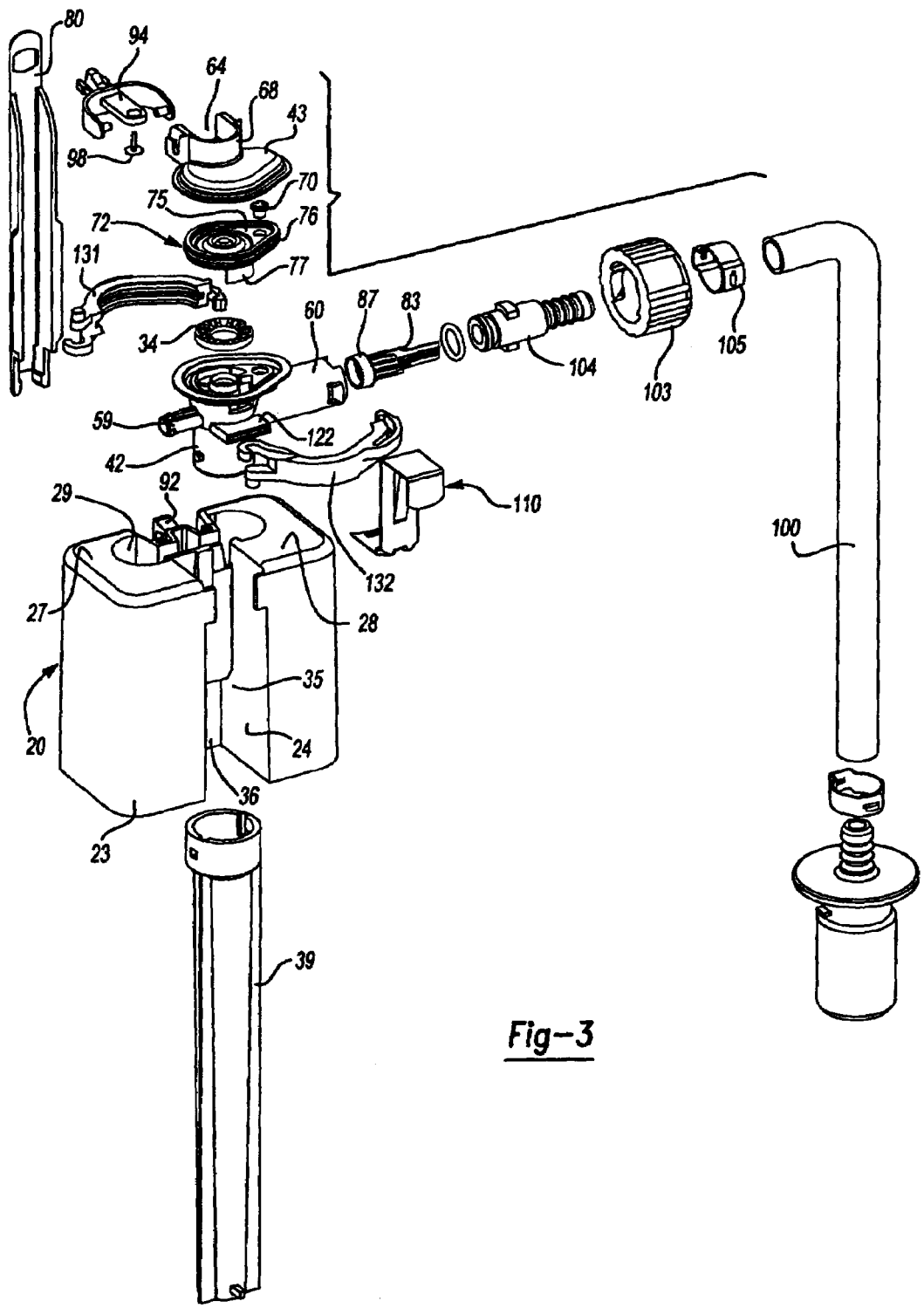
FIG. 3 is an exploded perspective view of the fill valve and water inlet tube.
Figure 10:
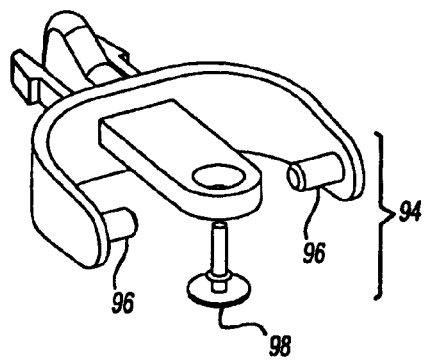
FIG. 10 is a top, rear, exploded perspective view of the horizontal, pivoting lever and pilot orifice seal.
Figure 11:
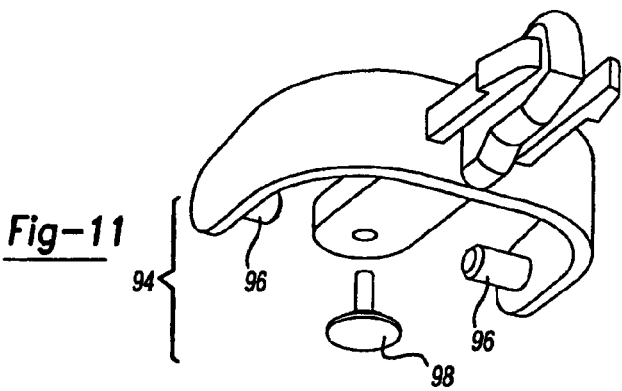
FIG. 11 is a bottom, front perspective exploded view of the horizontal, pivoting lever and pilot orifice seal.
Figure 12:
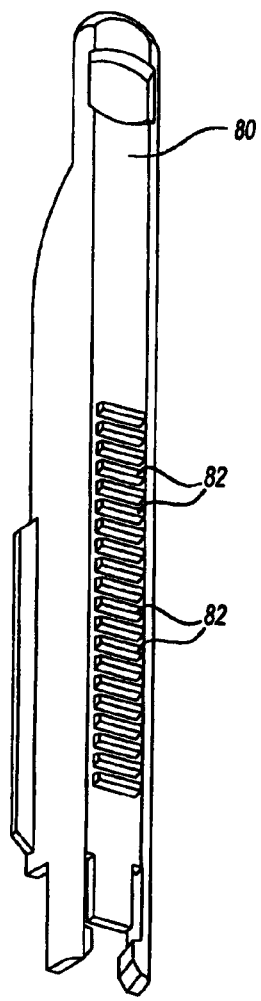
FIG. 12 is a perspective view of the vertical adjustment bar with locking teeth.
Figure 20:
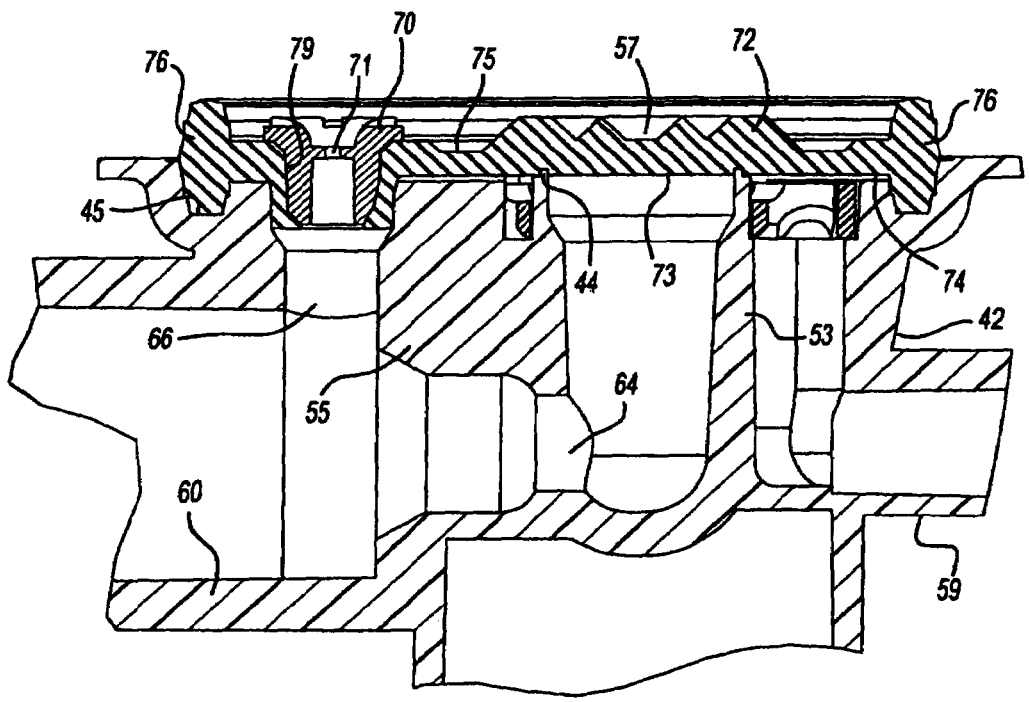
FIG. 20 is a front elevational fragmentary sectional view of the valve head with cap and clamp removed.
Figure 21:
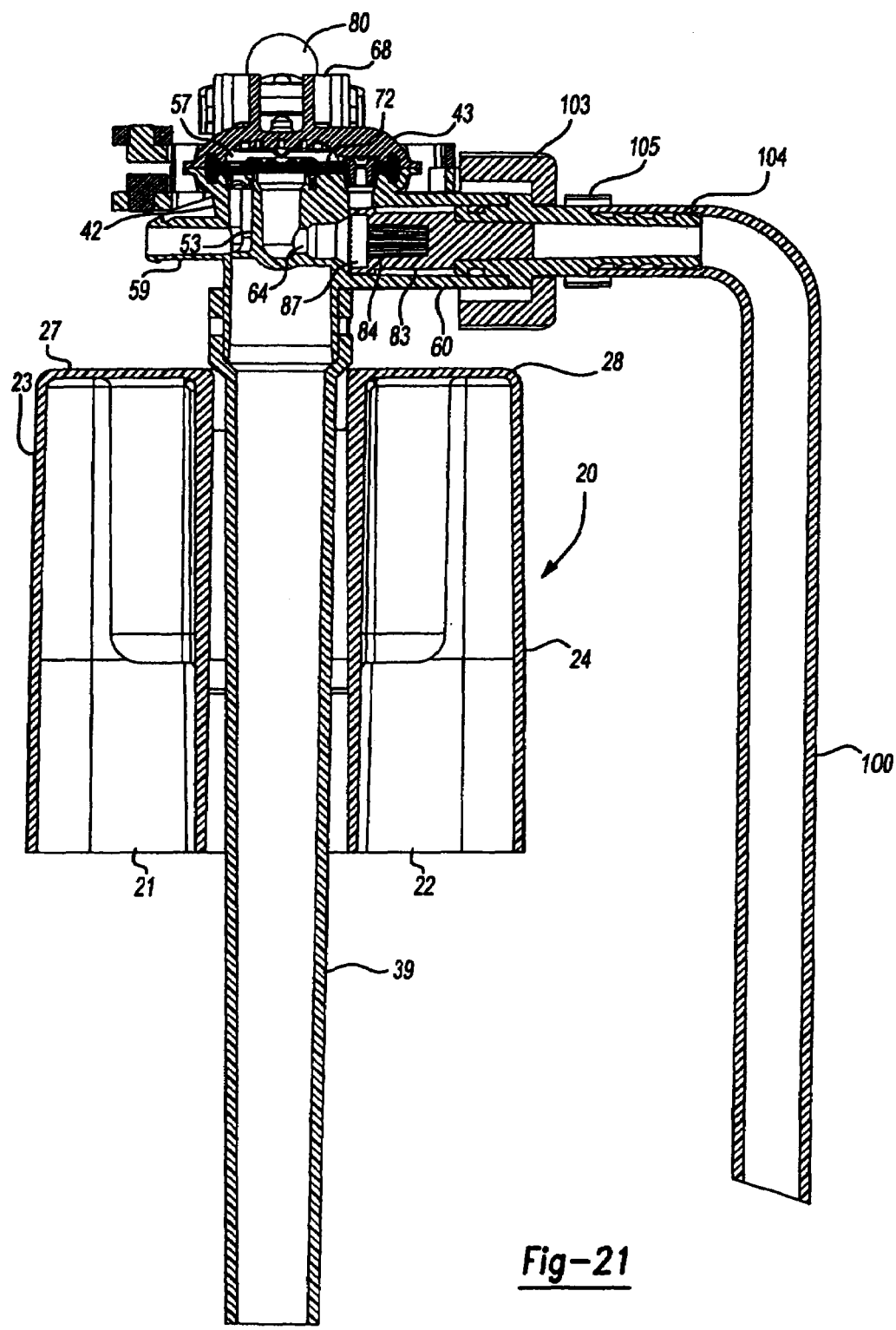
FIG. 21 is a sectional view of the fill valve, float, outlet tube, and water inlet tube with the float in a raised position taken along line 21—21 in FIG. 1.

Water enters the valve head 40 through water supply inlet tube 100 which communicates with and, as shown in FIGS. 3 and 4, is mechanically joined to, water inlet extension tube 60 of body section 42. Water inlet extension tube 60 has two apertures therein. One, the pilot chamber aperture 62, is located in the top wall of inlet extension tube 60 and communicates with the pilot valve. Aperture 62 is off-center, i.e., it is not in the direct path of main water flow. The other aperture 64 is in the downstream end of extension tube 60 and communicates with the main valve. Aperture 64 is in the direct flow path of water. Aperture 64, as shown in FIG. 20, is constricted and gradually narrowed in the downstream direction by wall 55 of body section 42. This restriction is downstream of the pilot chamber aperture 62. This is important because at high operating pressures there is less of a pressure differential in pilot chamber as the valve is turned off resulting in a better controlled rate of closure of the valve at high pressures. Inlet extension tube 60 is generally perpendicular to valve seat tube 53 which defines valve seat 44 at its top or downstream end.

A filter 83 is removably disposed in water inlet extension tube 60. The filter serves to filter out particulate matter and keep it from entering aperture 62 and the pilot valve. The filter 83, as seen in FIG. 17, has two filtering sections. The first section 84 serves to filter out coarser particulate matter. The first section 84 has through slots 85. The second section 87 serves to filter out finer particulate matter. As best illustrated in FIG. 17 the second section 87 has a series of castellations 88.

Figure 19:
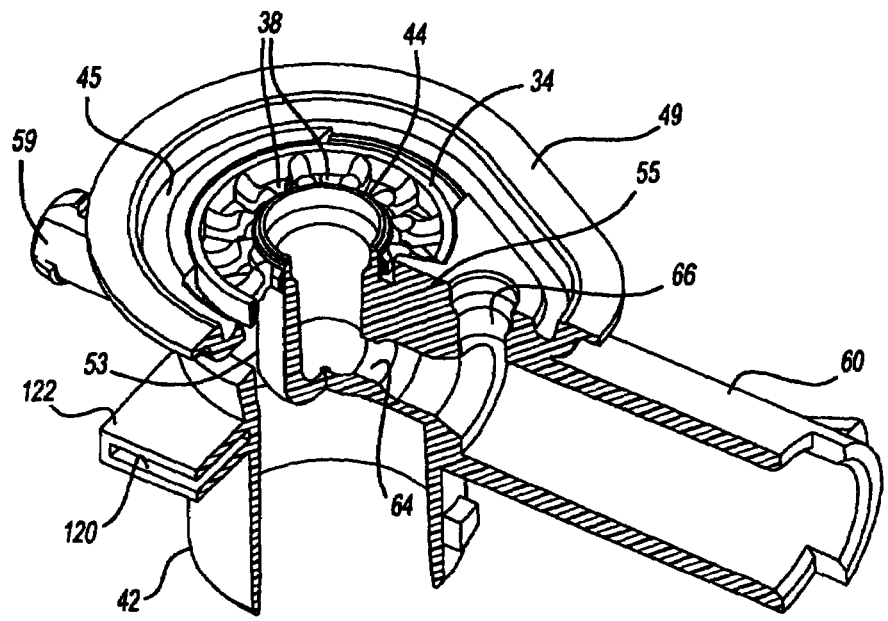
FIG. 19 is a top perspective view of the valve head body with the valve head ring insert with portions broken away.

An annular support member 34 is disposed in body section 42 of the valve head 40 as illustrated in FIG. 19. The support member 44 provides support to the bottom 74 of the flexible diaphragm 72, more particularly to the outer or peripheral bottom areas of the flexible diaphragm 72. Support member 34 has a plurality of through openings 38 to allow the flow of water therethrough.

Figure 22:
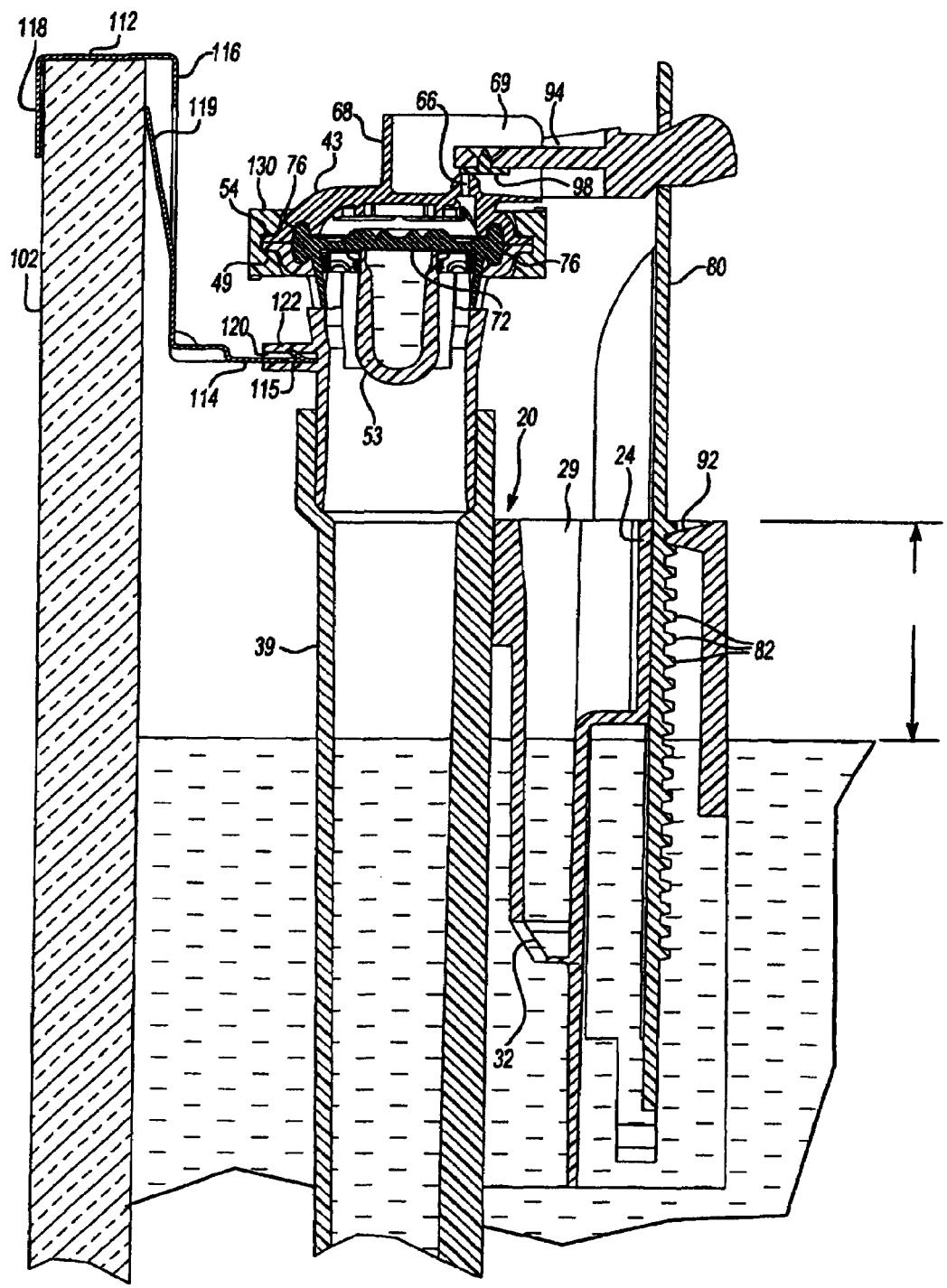
FIG. 22 is a right side elevational view in section showing the fill valve in the off state.

A well known and conventional duck bill 152 is disposed adjacent aperture 64 and prevents backflow in a conventional and well known manner. A cover cap 150 can be mounted over the pilot valve as seen in FIG. 22.

Figure 23:
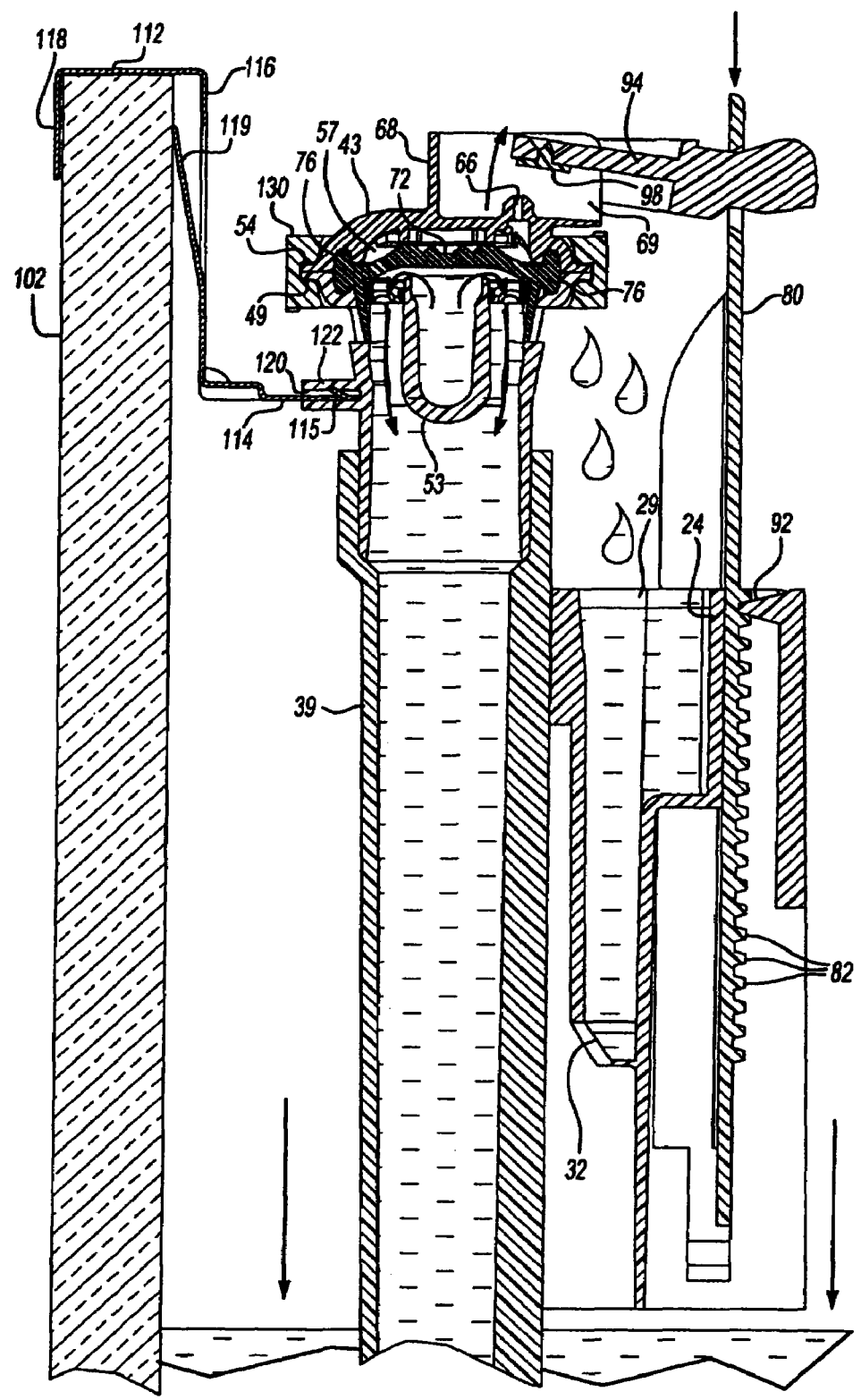
FIG. 23 is a right side elevational view in section showing the fill valve at a subsequent time in the flush cycle when the tank is nearly empty with the float in a lowered position and the pilot valve aperture open.

The operation of the fill valve will now be described. When an external handle on the exterior of the flush tank is pulled to flush the toilet bowl, water in the flush tank is released into the toilet bowl through a conventional and well known flush valve in the bottom of the tank. The water level in the tank drops and the float 20 moves downwardly as the water level drops. The downward movement of float 20 causes a corresponding downward movement of adjustment bar 80, which is mechanically coupled, as illustrated in FIG. 2, to float 20 and at its top end to horizontal pivoting-lever 94. Downward movement of the bar 80 causes pivoting lever 94 to pivot upwardly about its pivot 96 in a clockwise direction, as shown in FIG. 23. This causes the pilot orifice seal 98, which is mounted in the end of lever 94, to be raised off of the pilot valve orifice 66 so as to open the pilot valve orifice 66. FIG. 22 shows the pilot valve orifice 66 closed and sealed by pilot orifice seal 98, while FIG. 23 shows the pilot valve orifice 66 open. Opening of the pilot valve orifice 66 allows water in pilot valve cavity 57 above the flexible diaphragm 72 to flow out of cavity 57 through pilot valve orifice 66 in cap 43 and flow into the detent chamber 29 in float 20. Guide wall 68 located on top of cap 43 and partially surrounding pilot valve orifice 66 directs the flow of water from the pilot valve orifice 66 through its open end 69 into the detent chamber 29.

This outflow of water from pilot valve cavity 57 reduces the pressure on the upper side 75 of flexible diaphragm 72, thereby allowing the incoming water from the water inlet tube 100 and water inlet extension tube 60 to flow into valve seat tube 53 and lift the central bottom section 73 of flexible diaphragm 72 off of the valve seat 44.

Water entering the valve seat tube 53 flows through filter 83, where it is filtered, and through constricted aperture 64. Water also flows into pilot valve cavity 57 through the aperture 62 in the top of the wall of the water inlet extension tube and through the through hole 71 in insert 70 which is mounted in pilot valve cavity inlet aperture 79 in the flexible diaphragm. However, the outflow capacity of water from the pilot valve cavity 57 through pilot valve orifice 66 exceeds the inflow capacity of water into the pilot valve cavity 57, thereby keeping the water pressure in the pilot valve cavity 57, which acts on the upper side 75 of diaphragm 72, less than the water pressure in the valve seat tube 53, which acts on the bottom side 74 of diaphragm 72. Thus, as long as the pilot valve orifice 66 is open the diaphragm 72 will be flexed upwardly off of valve seat 44 at the top of valve seat tube 53.

Water now flows out of the valve seat tube 53 and into interior outlet passages 50, 51 in body section 42, and thence through outlet tube 39 into the tank. This is the main water supply to the tank for the refill operation.

Figure 24:
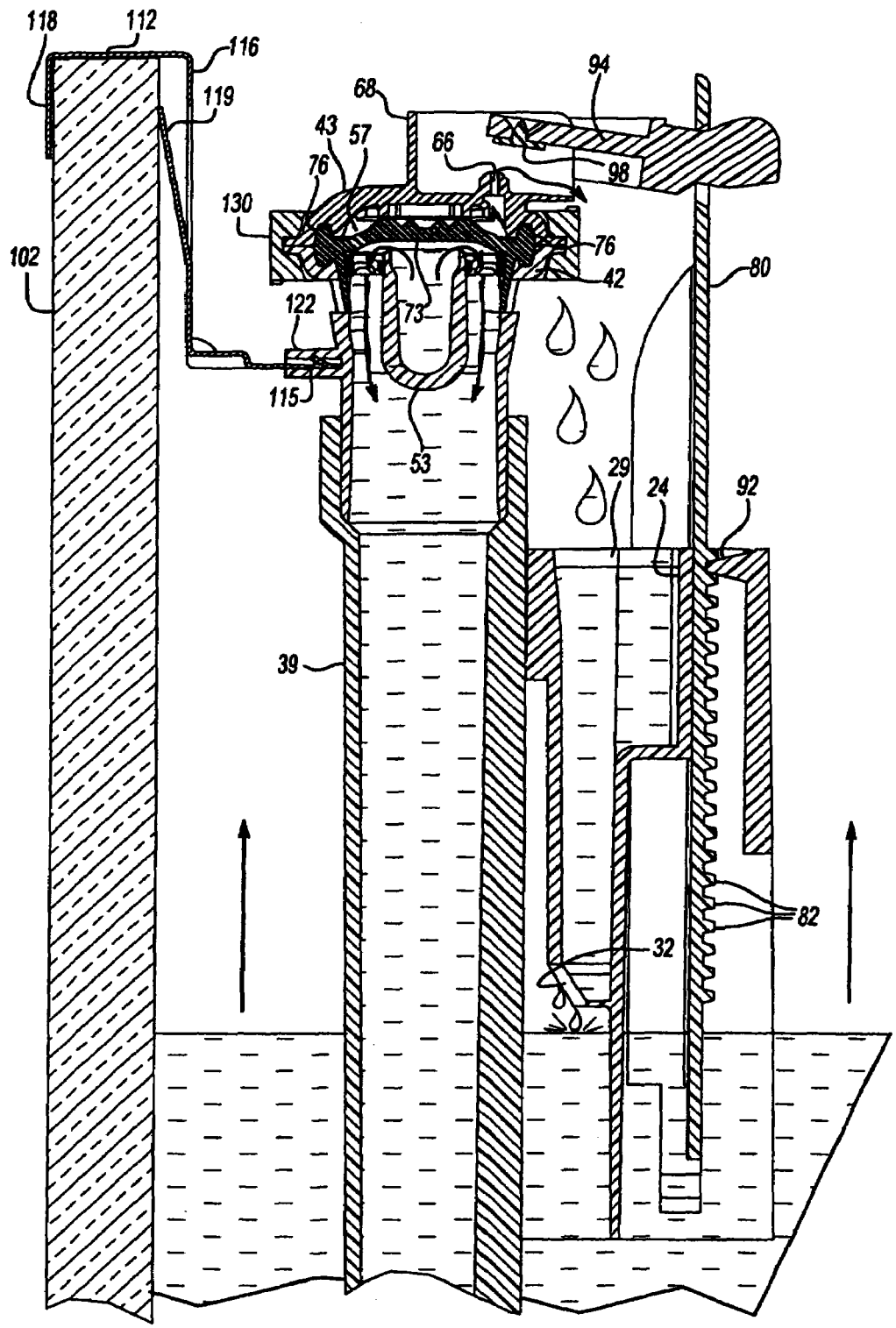
FIG. 24 is a right side elevational view in section showing the fill valve at a subsequent time following the flush cycle when the tank is beginning to be refilled with the float rising with the rising water level and the pilot valve aperture open.

A drop in the water level in the tank and the resultant drop of float 20 will result in a corresponding drop of bar 80. The drop of bar 80 will pivot lever 94 in a clockwise direction as shown in FIG. 23. The clockwise or upward pivotal movement of lever 94 will move pilot orifice seal 98 away from its sealing position on pilot valve orifice 66, thereby opening pilot valve orifice 66. Opening pilot valve orifice 66 reduces the water pressure in the pilot valve cavity 57. This allows flexible diaphragm 72 to flex upwardly off of valve seat 44, thereby allowing water to flow out of valve seat tube 53 and into interior outlet passages 50, 51 in body section 42 and then through outlet tube 39 into the tank to refill the tank as illustrated in FIGS. 23 and 24. The water in pilot valve cavity 57 is vented out through pilot valve orifice 66 and is directed by guide wall 68 to the open end 69 and from there flows into the detent chamber 29 as illustrated in FIGS. 23 and 24. The water in the detent chamber 29 is discharged from detent chamber 29 into the tank through drains 32 and 33 as shown in FIG. 24.

This refill water, combined with that already in the tank, results in a more complete and improved flushing of the toilet bowl.

Figure 25:
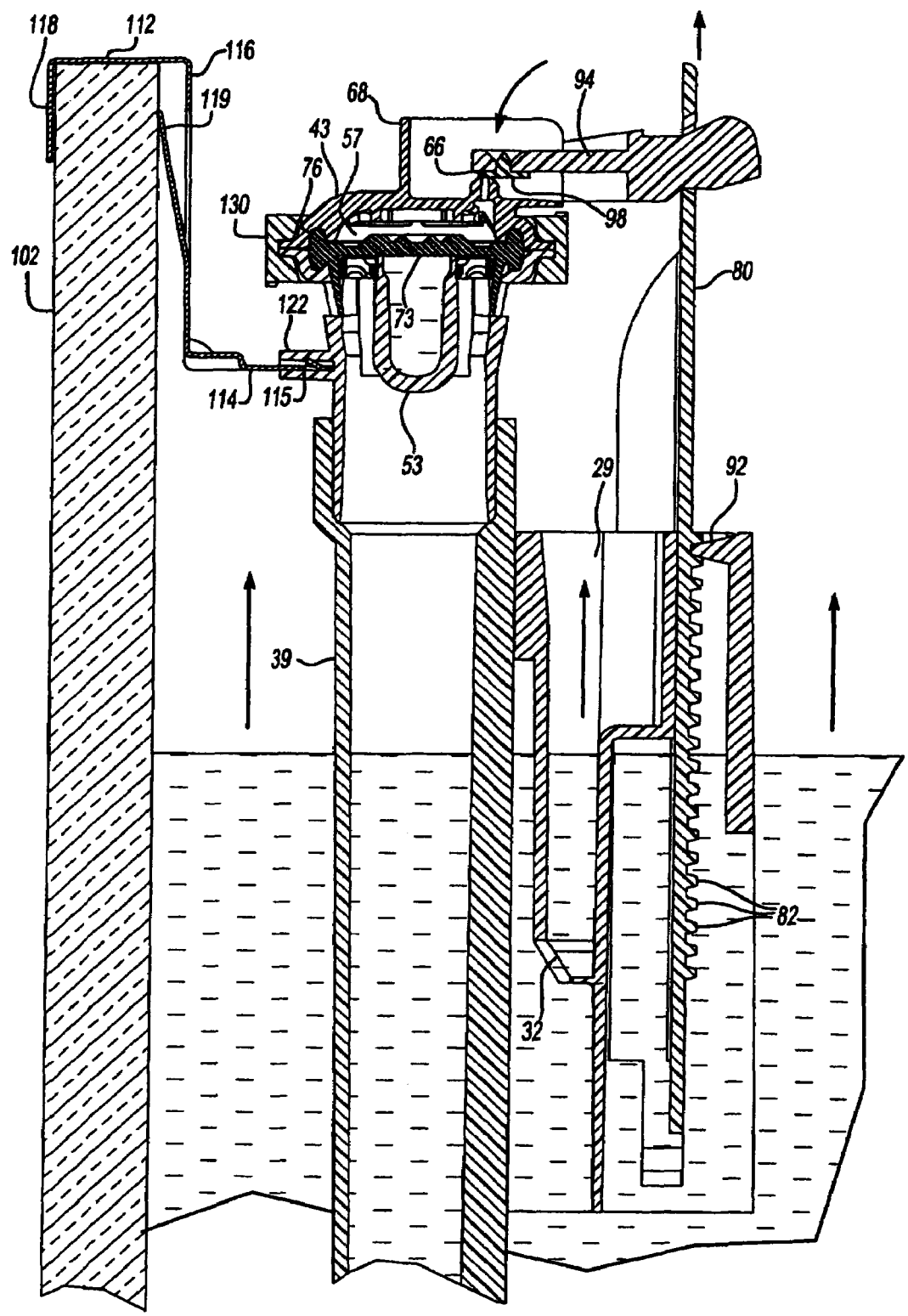
FIG. 25 is a right side elevational view in section showing the fill valve at a subsequent time in the refilling of the tank with the float rising with the rising water level and the pilot valve aperture closed.

As the water within the tank rises, the float 20 will also rise with a corresponding rise in the bar 80. The rise of bar 80 causes lever 94 to pivot in a counterclockwise direction as illustrated in FIG. 25. This counterclockwise and downward movement of lever 24 forces pilot orifice seal 98 into sealing engagement with pilot valve orifice 66 thereby closing pilot valve orifice 66. This results in an increase in water pressure in pilot valve cavity 67 acting on the top 75 of diaphragm 72 until it exceeds the pressure in valve seat tube 53 acting on the underside of diaphragm 73. At this point diaphragm 72 is forced onto valve seat 44 and shuts off any more water coming in from valve seat tube 53. The tank refill cycle is thereby terminated.

Water also flows through refill tube 59 and an associated hose or the like (not shown) to the toilet bowl to refill the toilet bowl.

The fill valve of the instant invention is modular and can be mounted anywhere within the tank. It can, for example, as illustrated in FIG. 23, be mounted on the wall 102 of the tank. The mounting system of the fill valve comprises a mounting hook 110 having an upper horizontally extending plate shaped leg 112 and a lower horizontally extending plate shaped leg 114. The two legs 112 and 114 are joined by a vertical plate 116. Plate 118 extends downwardly from leg 112 forming a generally U-shaped structure with leg 112 and plate 116. As illustrated in FIG. 22 the U-shaped structure goes over the wall 102 of a tank while the lower horizontally extending leg 114 is inserted into a slot 120 in bracket 122.

The vertical plate 116 has a cut out tongue 119 which is relatively flexible so that the U-shaped structure of hook 110 can be mounted on walls of different thickness. The lower leg 114 has a barb thereon to prevent accidental withdrawal from slot 122.

The water inlet tube 100 is connected to the water inlet extension tube 60 of valve body section 42 by collar 103, connector 104, and clamp 105.

The instant fill valve is modular. That is to say it can be attached to water supply sources other than water inlet tube 100 and with different outlet tubes other than outlet tube 39.

Body section 42 of valve head 40 has a circumferential flange 49. Cap 43 has a circumferential flange 54. As illustrated in FIG. 22 these flanges 49 and 54 are disposed in and compressed by interior correspondingly shaped groove 133 in clamp 130 when clamp 130 is closed. Clamp 130 holds or locks cap 43 to body section 42. Clamp 130 is comprised of two half sections 131 and 132. They are pivotally joined by posts 136, 137 and hooks 134, 135. Post 136 fits into hook 135 while post 137 fits into hook 134. This arrangement allows the two halves 131, 132 to open and close. In the closed position the two tabs 138, 139 are used to lock the clamp.

We claim:

1. A fill valve for a toilet comprising:
   a water inlet extension tube formed in a valve body;
   an aperture extending from said water inlet extension tube to a valve seat tube for directing a flow of water from said inlet extension tube through a main valve located at an opposing end of said valve seat tube, and into a toilet bowl;
   a pilot valve passageway extending from said inlet extension tube said pilot valve passageway containing a pilot valve orifice, wherein said pilot valve orifice is located upstream from said aperture, and outside a direct flow path through said water inlet extension tube into said valve seat tube, said main valve having a first side facing said valve seat tube, and pilot valve orifice supplying water to an opposite side of said main valve relative to said valve seat tube.

2. The fill valve for a toilet as recited in claim 1, wherein said aperture has a first end attached to said water inlet extension tube, said aperture including an interior diameter decreasing in a direction away from said inlet tube thereby controlling a rate of closure of said main valve.

3. The fill valve as recited in claim 2, wherein said interior diameter of said aperture is smaller than an interior diameter of said water inlet extension tube and an interior diameter of said valve seat tube.

4. The fill valve as recited in claim 2 further including said main valve being a valve diaphragm for sealing an opposing end of said valve seat tube, and said decrease in said inlet extension tube diameter corresponding to a rate of sealing of said valve seat tube.

5. The fill valve of claim 1 wherein said pilot valve is received in a potion of said main valve.

6. The fill valve of claim 1 wherein said main valve is a diaphragm valve.

7. A fill valve for a toilet comprising:
   a valve seat tube formed in a valve body, said valve seat tube positioned along a direction having at least a component in a vertical direction and including a valve seat formed on an upper end of said valve seat tube; and
   a valve diaphragm having a first side positioned to seal said valve seat tube, said valve diaphragm having contoured ridges formed on an opposing side relative to said first side and over an area of said valve seat tube.

8. The fill valve of claim 7, wherein said contoured ridges increase the surface area of said diaphragm on said opposing side.

* * * * *